US008322434B2

(12) United States Patent
Fielding et al.

(10) Patent No.: US 8,322,434 B2
(45) Date of Patent: Dec. 4, 2012

(54) VERTICAL ANNULAR SEPARATION AND PUMPING SYSTEM WITH OUTER ANNULUS LIQUID DISCHARGE ARRANGEMENT

(75) Inventors: Brian J. Fielding, Luanda (AO); Tracy A. Fowler, Sugar Land, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 976 days.

(21) Appl. No.: 11/922,813

(22) PCT Filed: May 2, 2006

(86) PCT No.: PCT/US2006/017136
§ 371 (c)(1),
(2), (4) Date: Feb. 3, 2009

(87) PCT Pub. No.: WO2007/021337
PCT Pub. Date: Feb. 22, 2007

(65) Prior Publication Data
US 2009/0211764 A1    Aug. 27, 2009

Related U.S. Application Data

(60) Provisional application No. 60/706,799, filed on Aug. 9, 2005.

(51) Int. Cl.
*E21B 43/01* (2006.01)
(52) U.S. Cl. ........ 166/357; 166/339; 166/344; 166/351; 166/267; 166/105.5; 95/262; 96/204
(58) Field of Classification Search .................. 166/357, 166/339, 344, 345, 347, 351, 352, 368, 265, 166/267, 68, 369, 370, 372, 105, 105.5; 95/260, 95/262; 96/204, 215
See application file for complete search history.

(56) References Cited

U.S. PATENT DOCUMENTS

| | | | | |
|---|---|---|---|---|
| 2,398,339 A * | 4/1946 | Watts | ............... | 166/105.5 |
| 2,446,882 A * | 8/1948 | Morrison | ............... | 55/347 |
| 3,048,122 A * | 8/1962 | Hansen | ............... | 166/105.5 |
| 3,128,719 A * | 4/1964 | Jongbloed et al. | ............... | 166/105.5 |
| 4,268,277 A * | 5/1981 | Rooker | ............... | 95/269 |
| 4,344,774 A | 8/1982 | Skipper | | |
| 4,481,020 A | 11/1984 | Lee et al. | | |
| 4,531,584 A * | 7/1985 | Ward | ............... | 166/265 |

(Continued)

FOREIGN PATENT DOCUMENTS
EP    0 711 903 B1    9/1999
(Continued)

OTHER PUBLICATIONS

PCT International Search Report and Written Opinion, Application No. PCT/US06/17136 issued Oct. 23, 2006.

(Continued)

*Primary Examiner* — Matthew Buck
(74) *Attorney, Agent, or Firm* — ExxonMobil Upstream Research Company Law Department

(57) ABSTRACT

A Vertical Annular Separation and Pumping System (VASPS) utilizing a outer annulus liquid discharge arrangement to replace a standard pump shroud associated with an electrical submersible pump. The outer annulus liquid discharge arrangement directs produced wellbore liquids around the electrical submersible pump motor to provide a cooling medium to prevent overheating and premature failure of the electrical submersible pump.

4 Claims, 3 Drawing Sheets

U.S. PATENT DOCUMENTS

| | | | |
|---|---|---|---|
| 4,793,418 A | | 12/1988 | Wheeler et al. |
| 4,848,475 A | | 7/1989 | Dean et al. |
| 4,900,433 A | * | 2/1990 | Dean et al. ............... 210/170.11 |
| 4,981,175 A | | 1/1991 | Powers |
| 4,982,794 A | | 1/1991 | Houot |
| 5,232,475 A | * | 8/1993 | Jepson ............................ 95/260 |
| 5,389,128 A | | 2/1995 | Lopes |
| 5,431,228 A | * | 7/1995 | Weingarten et al. .......... 166/357 |
| 5,462,585 A | | 10/1995 | Niskanen et al. |
| 5,474,601 A | * | 12/1995 | Choi ................................ 96/182 |
| 5,531,811 A | * | 7/1996 | Kloberdanz .................... 95/261 |
| 5,570,744 A | * | 11/1996 | Weingarten et al. .......... 166/357 |
| 5,698,014 A | * | 12/1997 | Cadle et al. ...................... 96/157 |
| 5,902,378 A | * | 5/1999 | Obrejanu ........................ 95/248 |
| 6,035,934 A | * | 3/2000 | Stevenson et al. ............. 166/265 |
| 6,036,749 A | * | 3/2000 | Ribeiro et al. ................... 95/261 |
| 6,039,116 A | * | 3/2000 | Stevenson et al. ............. 166/263 |
| 6,053,249 A | * | 4/2000 | Stevenson et al. ......... 166/305.1 |
| 6,068,053 A | | 5/2000 | Shaw |
| 6,080,312 A | | 6/2000 | Bowers et al. |
| 6,082,452 A | | 7/2000 | Shaw et al. |
| 6,089,317 A | | 7/2000 | Shaw |
| 6,131,655 A | | 10/2000 | Shaw |
| 6,216,799 B1 | | 4/2001 | Gonzalez |
| 6,230,810 B1 | * | 5/2001 | Rivas ............................ 166/357 |
| 6,234,248 B1 | * | 5/2001 | Knight ........................ 166/105.5 |
| 6,257,333 B1 | * | 7/2001 | Mann et al. .................... 166/265 |
| 6,283,204 B1 | * | 9/2001 | Brady et al. ................ 166/105.5 |
| 6,364,940 B1 | * | 4/2002 | Prueter et al. .................... 95/261 |
| 6,367,547 B1 | | 4/2002 | Towers et al. |
| 6,394,182 B1 | * | 5/2002 | Fadel ............................ 166/265 |
| 6,481,499 B2 | * | 11/2002 | Lopes ...................... 166/250.03 |
| 6,494,258 B1 | * | 12/2002 | Weingarten .................... 166/265 |
| 6,547,003 B1 | * | 4/2003 | Bangash et al. .............. 166/106 |
| 6,564,865 B1 | * | 5/2003 | Brady et al. ................ 166/105.3 |
| 6,651,745 B1 | | 11/2003 | Lush et al. |
| 6,688,392 B2 | * | 2/2004 | Shaw ............................ 166/366 |
| 6,723,158 B2 | * | 4/2004 | Brown et al. .................... 96/214 |
| 6,755,250 B2 | * | 6/2004 | Hall et al. ...................... 166/265 |
| 6,821,322 B2 | * | 11/2004 | Milia .............................. 96/209 |
| 6,932,160 B2 | * | 8/2005 | Murray et al. ................ 166/369 |
| 6,964,299 B2 | * | 11/2005 | Scarsdale ...................... 166/105 |
| 7,150,325 B2 | * | 12/2006 | Ireland et al. ................. 166/366 |
| 7,152,682 B2 | | 12/2006 | Hopper |
| 7,476,317 B2 | * | 1/2009 | Nassif ......................... 210/512.1 |
| 7,481,270 B2 | * | 1/2009 | Shepler ........................ 166/105 |
| 7,534,354 B2 | * | 5/2009 | Oserod .......................... 210/703 |
| 7,914,266 B2 | * | 3/2011 | Kerr et al. ................... 417/410.1 |

FOREIGN PATENT DOCUMENTS

| | | |
|---|---|---|
| EP | 1 103 698 B1 | 5/2001 |
| GB | 895849 | 5/1962 |
| WO | WO 99/10070 | 3/1999 |
| WO | WO 01/88335 A1 | 11/2001 |
| WO | WO 03/100212 A1 | 1/2003 |

OTHER PUBLICATIONS

European Search Report No. 113086 issued Feb. 6, 2006.

Bybee, Karen. "Vertical Annular Separation and Pumping System." *Journal of Petroleum Technology*, vol. 54, No. 10 (Oct. 2002): pp. 44-45, 72.

Villa, M., et al. "Installation of the VASPS Subsea Gas-Liquid Separation and Pumping System in Marimba Field." Petroleum Abstracts No. 757319, 12th Annual Deep Offshore Technology International Conference, New Orleans, LA, (Nov. 7-9, 2000): pp. 1-19.

Henderson, C.P. "Downhole Separation Systems: The Ins and Outs of Downhole Separation." *Scandinavian Oil-Gas Magazine* No. 1/2 2000: pp. 11-14.

Villa, M. et al. "VASPS: An Innovative Subsea Separation System." Deep Offshore Technology, 11th Technology Conference and Exhibition, Stavanger, Norway, (Oct. 19-21, 1999): pp. 1-13.

Baker, A. C., et al. "The VASPS Subsea Separation and Pumping System Applied to Marginal Field Developments" SPE 23049, Offshore Europe Conference, Sep. 3-6, 1991, pp. 193-202, Aberdeen, Aberdeen City, UK.

Entress, J.H. et al. "The Current State of Development of the VASPS Subsea Separation and Pumping System" OTC 6768, 23rd Annual Offshore Technology Conference, May 6-9, 1991, pp. 627-635, Houston, Texas.

Baker, A. C., et al. "Application of Subsea Separation and Pumping to Marginal and Deepwater Field Developments" SPE 20698, 65th Annual Technical Conference and Exhibition of the Society of Petroleum Engineers, Sep. 23-26, 1990, pp. 783-789, New Orleans, LA.

Gregory, J., 1989. VASPS sends Subsea separation on downward spiral to success. *Offshore Engineer*, vol. 24, pp. 35-36.

Lea, J. F. et al. "What's new in artificial lift." *World Oil Magazine* Apr. 2004: vol. 22, No. 4. WorldOil.com. Jun. 16, 2004 <http://www.worldoil.com/magazine/MAGAZINE_DETAIL.asp?ART_ID=2256&MONTH_YEAR=Apr-2004>.

Do Vale, O.R., et al "VASPS Installation and Operation at Campos Basin" , OTC 14003; The 2002 Offshore Technology Conference, 2002, pp. 1-13, XP 002364428.

* cited by examiner

VERTICAL ANNULAR SEPARATION AND PUMPING SYSTEM WITH OUTER ANNULUS LIQUID DISCHARGE ARRANGEMENT

CROSS REFERENCE TO RELATED APPLICATIONS

This application is the National Stage of International Application No. PCT/US06/017136, which claims the benefit of U.S. Provisional Application No. 60/706,799, filed 9 Aug. 2005. This application is related to International Application No. PCT/US06/016702 entitled "Vertical Annular Separation and Pumping System With Integrated Pump Shroud and Baffle", which claims the benefit of U.S. Provisional Application No. 60/706,740 filed on 9 Aug. 2005.

FIELD OF THE INVENTION

This invention relates to a vertical annular separator for separating a fluid stream into a liquid phase stream and a gas phase stream. In particular, this invention relates to an apparatus for and methods of separating produced hydrocarbon fluids and other wellbore fluids into liquid and gas phase streams at subsea locations and directing the separated phase streams to other locations.

BACKGROUND OF THE INVENTION

Offshore or subsea hydrocarbon deposits continue to attract significant attention from oil and gas producers throughout the world. As onshore hydrocarbon deposits currently in production, particularly in the United States, are depleted and as larger onshore oilfields are discovered only infrequently, producers increasingly look for new exploration and production opportunities in offshore locations.

A factor limiting the development of many of the discovered offshore hydrocarbon deposits, particularly crude oil, natural gas, and associated natural gas liquids, is the cost to install and maintain equipment and facilities to produce the hydrocarbons. Offshore drilling and production platforms and subsea production equipment installations require sizeable investments. In trying to maximize the economic benefits from offshore facilities, producers focus on reducing the installation weight and costs of the equipment on the offshore production platforms necessary to produce the hydrocarbons.

By reducing the installation weight and costs of equipment, new offshore installations may be smaller and less expensive for producing newly discovered fields and existing offshore installations may be further modified to handle the production from more wells and larger production areas. By using existing facilities, a production facility may exploit marginal reservoirs adjacent to or near existing fields. Also, by using existing facilities to produce new or marginal discoveries, an oil producer can extend the life of the facilities and increase the level of recoverable reserves at costs less than those required for new discoveries and new installations. Often such new or marginal discoveries may be located at a remote location, e.g. 5 to 15 miles (8 to 24 km), from existing production platforms or facilities. Large, lengthy flowlines are installed to transport produced wellbore fluids, primarily crude oil, natural gas, natural gas liquids, and water, to these platforms or facilities from such a remote location.

Although large, lengthy flowlines are significantly less expensive that new offshore production platforms, such flowlines may limit the fluid production rate from a given well. One of the more significant factors limiting the amount of fluid a given oil or gas well may produce is the amount of back pressure exerted at the wellhead by facilities downstream of the wellhead. One measure of the amount of such back pressure is referred to as the wellhead flowing pressure. The wellhead flowing pressure is typically the pressure at the wellhead during normal operating conditions without a wellhead choke or other flow restriction means in the wellhead. When the wellhead flowing pressure can be reduced, a typical well can produce more fluid from a given reservoir, which leads to a longer field production life and more oil and gas recovery.

Several factors can cause increases in wellhead flowing pressure in a given well. For example, flowlines from subsea wellheads to separation facilities may in some cases be several miles long which can result in significant friction losses caused by the turbulent, multiphase fluid flow in the flowlines. Such friction losses result in an increase in pressure required to move a given amount of fluid through a flowline. This pressure increase, when added to the operating pressures of facilities downstream of the wellhead, may significantly increase the wellhead flowing pressure. Another factor that causes increases in wellhead flowing pressure are changes in elevation from deepwater subsea fields to shallow water facilities. (Such changes in elevation cause an increased fluid head, i.e. a column of fluid, in a flowline which increases the wellhead flowing pressure and significantly reduces fluid production.) Still another factor that may increase the wellhead flowing pressure is the gas-liquid (two-phase) flow regime in the flowline to the production platform. Such two-phase flow results in increased pressure losses compared to single phase flow in a flowline, such as where gases are produced through one flowline and liquids (oil and water) are produced through another flowline. A separate, but related, problem may occur in a two-phase flow when large volumes of liquids accumulate in a flowline and upon accumulation of adequate pressure, are pushed forward and produced in a very short period of time as large slugs of liquids. Liquids produced during a slugging event can overwhelm the fluid handling capabilities of equipment employed on an offshore platform or facility as well as create high back pressures on a well.

Several efforts have been proposed and implemented to reduce the wellhead flowing pressure by separating produced wellbore fluids into gas and liquid streams at a subsea location and then providing separate flowlines to the platform or facilities for both the gas and liquid phase streams. One particularly innovative approach to separating wellbore fluids into gas and liquid phase streams at a subsea location is the vertical annular separation and pumping system (VASPS), as disclosed in U.S. Pat. No. 4,900,433, entitled "Vertical Oil Separator", assigned to The British Petroleum Company. U.S. Pat. No. 4,900,433 is hereby incorporated by reference in its entirety. A more detailed description of a VASPS is provided in "VASPS: An Innovative Subsea Separation System" presented at the 11th International Conference and Exhibition, Oct. 19-21, 1999 at Stavanger, Norway, which presentation is hereby incorporated by reference in its entirety. A VASPS unit relates generally to the technical areas of subsea multiphase boosting systems and artificial lifting methods for increasing reservoir production rates.

A VASPS is a two-phase (gas-liquid) separation and pumping system which may be installed in a subsea "dummy well" near the mudline of the subsea floor. A "dummy well" is a simple borehole, typically lined with a casing or similar pipe structure, extending into the subsea surface near the mudline a distance adequate to receive the VASPS. VASPS receives a full wellbore fluid stream and separates the stream into a gas phase stream and a liquid phase stream. The gas phase stream is then directed to a flowline and transported to other facilities for additional treating, while the liquid phase stream is pumped from the VASPS through a separate flowline to other treating facilities. Such subsea separation provides several benefits, including primary gas phase-liquid phase separation at a subsea location, which reduces the need for large, weighty separators on the offshore platforms to handle a gas-liquid flow regime and lessens "slugging" effects associated with such gas-liquid two-phase flow.

A typical VASPS unit includes an outer pressure housing, an inner helix separator assembly, a gas discharge annulus, a centrally located liquid discharge tube, a liquid discharge pump, and an electric motor to drive the liquid discharge pump. The entire VASPS unit would then be placed in an outer casing that may be cemented in the dummy well in the seabed. Alternatively, a VASPS unit may be placed in an outer housing mounted in a support placed on or near the subsea mudline.

During operation of a VASPS unit, a multiphase well stream (typically consisting of crude oil, natural gas, natural gas liquids, and salt water) enters the outer pressure housing and is directed to the inner helix separator for primary separation of the gas and liquid phase streams. This primary separation is accomplished through the application of centrifugal forces created by the cylindrical shape of the helix. Separated gas flows through holes in the helix into a gas discharge annulus and up into a gas expansion chamber. The gas then exits the VASPS unit into a separate flowline for delivery to and further treatment at the production facility (typically the offshore platform). Meanwhile, the degassed liquid flows in a counter-current direction from the exiting gas down the helix separator into a liquid sump area where it is pumped by the liquid discharge pump through the central liquid discharge tube into a separate flowline for delivery to and further treatment at the production facility (again typically the offshore platform).

Two of the key components for the removal of produced liquids from a VASPS unit are the electric motor and the liquid discharge pump. The electric motor is frequently combined with the liquid discharge pump to form an integrated unit referred to as an "electrical submersible pump" (ESP). ESPs are typically controlled and powered through an umbilical cord in communication with a remote control system and power source. The ESP discharges the produced, separated liquids through the liquid discharge tubing.

ESPs have long been used to produce liquid from wellbores, typically from formations having little or no produced gas. ESPs generally have difficulty (and are not particularly effective) in pumping fluids with significant volumes of free gas as the centrifugal impellers of an ESP are typically designed for pumping fluids rather than compressing gas. Hence, with gases separated from wellbore fluids in a VASPS unit, an ESP can operate more effectively and efficiently to remove liquids. ESPs are supplied by various oilfield equipment suppliers, including Schlumberger with its REDA® line of ESPs and Baker Hughes with its Centrilift® line of ESPs. In many installations, ESPs are positioned in wellbores so that the electric motor is mounted below the pump (including the pump intake and discharge outlets). In a typical installation in a vertical or near vertical well, an ESP is set below the well perforations to maximize liquid draw down and to minimize gas introduction into and interference with the pump.

During operation, an ESP's electric motor can produce significant amounts of heat. As ESPs have no separate, dedicated cooling system to remove heat generated during normal operations, ESPs are designed to use wellbore fluids as a cooling medium to keep the pump and the electric motor from overheating. In many ESP arrangements, the pump is mounted above the electrical motor. In such arrangements, a device referred to as a pump shroud is sometimes used to direct the wellbore fluids around the electric motor during operation and to remove heat generated during pump operation. Without such a pump shroud or other fluid directing device, wellbore fluid would not move past the electrical motor and therefore not remove any significant heat generated by the electrical motor. A pump shroud typically covers and encloses the pump inlet above the top of the electric motor and may be 75 to 100 feet (25 to 30 meters) long. The wellbore liquid flows along the outside of the pump shroud to the bottom of the ESP. The liquid then makes a 180-degree turn at the bottom of the pump shroud and then flows upward between the inside of the pump shroud and the electric motor, removing heat generated by the electric motor as the wellbore fluid moves past the motor and into the pump. The pump shroud is typically retrieved when the ESP is removed from the wellbore.

In some wellbores with ESP installations, as well as in wellbores using a VASPS unit, installed pump shrouds may create numerous problems and limitations to the operations of the ESP. An improperly mounted or damaged pump shroud can create multiple problems, such as misdirected fluid flow, which can lead to electric motor overheating, which can in turn lead to excessive scale build-up between the electric motor and the pump shroud, which can further lead to reduced fluid production due to scale build-up; poor gas separation due to pump shroud leakage; overheating of the electric pump causing shortened ESP run-times between repairs; and excessive pump shroud vibrations. Additionally, a pump shroud reduces the size of an ESP that can be placed in a given wellbore. If the pump shroud could be removed and replaced by a design that would provide the necessary wellbore fluid flow for adequate cooling of the ESP motor, larger ESPs, capable of moving more wellbore fluids, could be installed in a given opening. A more detailed description of a VASPS unit is provided below.

SUMMARY OF THE INVENTION

This invention provides an improved VASPS unit without the need for a separate pump shroud for redirecting fluid flow around the VASPS discharge pump through a rearrangement of the VASPS internal flow paths. Additionally, methods of operating a production facility using the improved VASPS to separate produced hydrocarbon fluids and other wellbore fluids into liquid and gas phase streams at subsea locations and directing the separated phase streams to other locations are also disclosed.

In particular, a subsea vertical separator of the present invention would include:
  (a) an intermediate casing within an outer casing, forming a first annulus;
  (b) an inner casing within the intermediate casing, forming a second annulus;
  (c) a fluid inlet in communication with the second annulus;
  (d) a liquid outlet in communication with the first annulus;
  (e) a gas passage in the inner casing for conducting separated gas phase fluids, wherein the gas passage has a gas inlet and a gas outlet;
  (f) a pump assembly comprising a pump positioned within the intermediate casing having (i) a pump intake in fluid communication with the second annulus and (ii) a pump discharge in fluid communication with the first annulus; and
  (g) a motor to drive the pump.

In any of the embodiments described, the subsea vertical separator could include a helix assembly positioned in the second annulus between the inner casing and the intermediate casing.

In any of the embodiments described, the subsea vertical separator could include an outer casing having a housing with an upper end and a lower end to provide pressure containment for the first annulus, second annulus, and gas passage.

In any of the embodiments described, the subsea vertical separator could include a separator head space in fluid communication with the first annulus.

In particular, a method for producing hydrocarbons from a subsea location comprising:
 (a) providing a production facility;
 (b) installing a subsea vertical separator capable of separating produced wellbore fluids into a liquid phase and a gas phase, such separator comprising:
  (i) an intermediate casing within an outer casing, forming a first annulus;
  (ii) an inner casing within the intermediate casing, forming a second annulus;
  (iii) a fluid inlet in communication with the second annulus;
  (iv) a gas passage in the inner casing for conducting separated gas phase fluids, wherein the gas passage has a gas inlet and a gas outlet;
  (vi) a pump assembly comprising a pump positioned within the intermediate casing having (a) a pump intake in fluid communication with the second annulus and (b) a pump discharge in fluid communication with the first annulus;
  (vii) a motor assembly to drive the pump;
 (c) installing a piping system to transport separated gas to the production facility;
 (d) installing a piping system to transport separated liquids to the production facility;
 (e) connecting a power source and a control source to the motor assembly;
 (f) producing wellbore fluids from the subsea location;
 (g) transporting the produced wellbore fluids to the separator fluid inlet;
 (h) separating the produced wellbore fluids into a gas phase and a liquid phase;
 (i) transporting the gas phase fluids to the production facility; and
 (j) transporting the liquid phase fluids to the production facility.

BRIEF DESCRIPTION OF THE DRAWINGS

Examples of the prior art and various embodiments of this invention are shown in the attached Figures, wherein.

DETAILED DESCRIPTION OF THE INVENTION

The present invention provides a VASPS unit with improved gas stream and liquid stream flow path arrangements. In the preferred embodiment, a multiple casing arrangement is used in conjunction with an ESP assembly to allow wellbore fluids to circulate and separate into a gas stream and a liquid stream prior to the gas stream exiting the unit passage and the fluid stream entering the ESP pump intake for transportation and further treating.

Apparatus Description

The prior art VASPS and the improved VASPS of the present invention will now be described with reference to the Figures.

Figure 1:
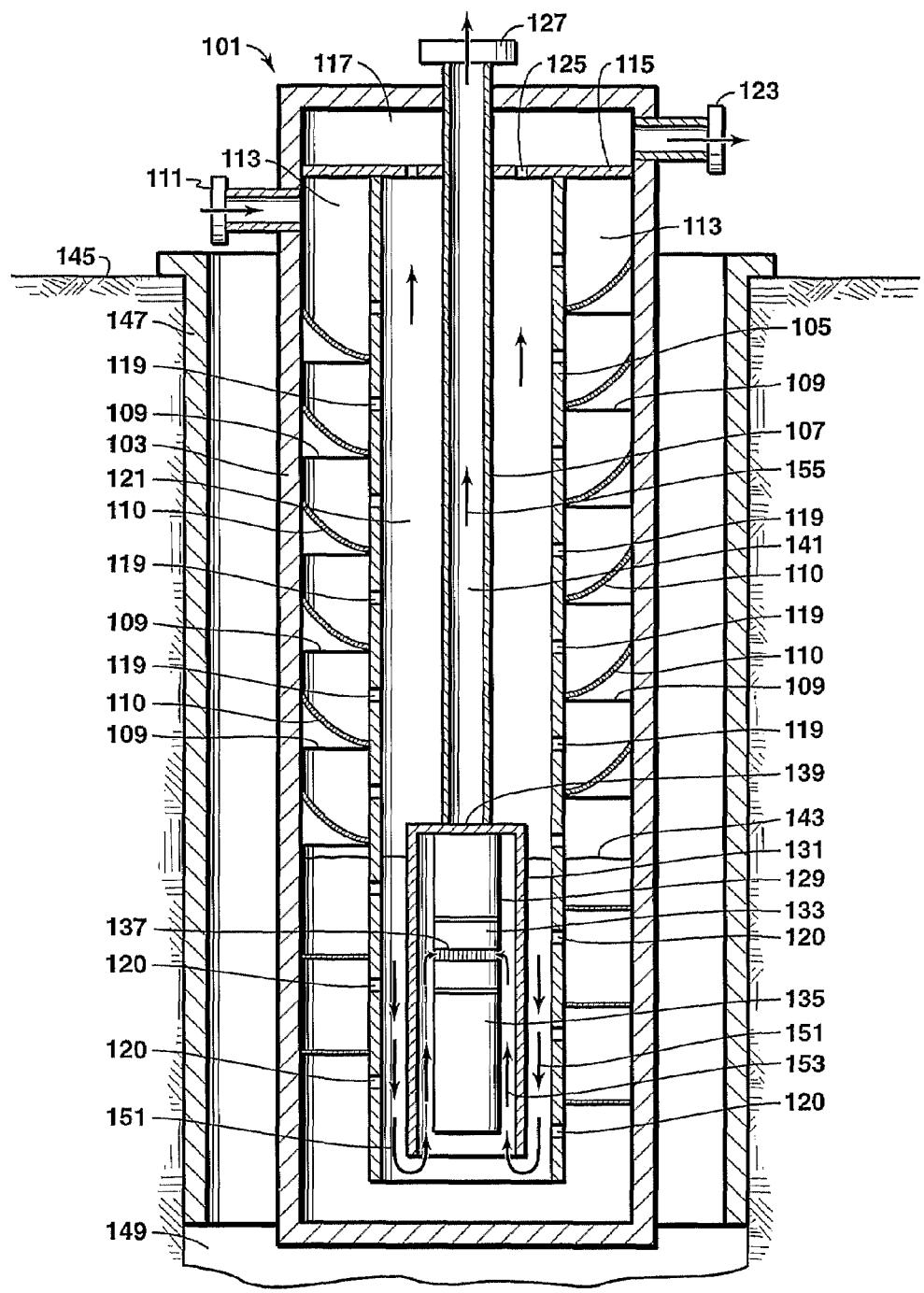
FIG. 1 is a sectional view of a prior art VASPS unit.

FIG. 1 shows a sectional view of a prior art VASPS unit 101. Prior art VASPS unit 101 comprises pressure housing 103 surrounding intermediate casing 105 surrounding inner casing 107, each typically in tubular form, constructed typically of standard size concentric oilfield pipe and casing materials. Typical sizes and materials of construction for these would include: (i) for pressure housing 103: 30 to 36 inch (0.8 to 1.0 meter) casing having an overall length of about 100 to 225 feet (30 to 70 meters); (ii) for intermediate casing 105: 16 to 26 inch (0.5 to 0.7 meter) pipe; and for inner casing 107: 8 to 10 inch (0.25 to 0.35 meter) screwed tubing.

Positioned between pressure housing 103 and intermediate casing 105 is helix assembly 109. Helix assembly 109 provides initial, primary separation of the gas phase and liquid phase of the produced fluids. Helix assembly 109 may be constructed from a length of metal plate twisted, rolled, or pressed to form a cylindrical spiral shape around and preferably connected to intermediate casing 105. Helix assembly 109 preferably intersects intermediate casing 105 perpendicularly or nearly perpendicularly as helix assembly 109 spirals around intermediate casing 105. FIG. 1 shows a cross section of helix assembly 109 as it abuts perpendicularly to intermediate casing 105.

Fluid inlet 111 allows fluids to enter pressure housing 103 into fluid annulus 113 formed between the inner wall of pressure housing 103 and the outer wall of intermediate casing 105. Plate 115 is located at the top of intermediate casing 105 and isolates separator head-space 117 from fluid annulus 113. Gas passages 119 extending through intermediate casing 105 allow for fluid (primarily gas) communication between fluid annulus 113 and gas annulus 121 formed between the inner wall of intermediate casing 105 and the outer wall of inner casing 107. Liquid passages 120 extending through intermediate casing 105 allow for fluid (primarily liquid) communication between fluid annulus 113 near the lower end of intermediate casing 105 during operation of VASPS unit 101. Gas passages 125 extending through plate 115 allow fluid (primarily gas) communication between gas annulus 121 and separator head-space 117. Gas outlet 123 extends through pressure housing 103 to allow fluid (primarily gas) communication between separator head-space 117 and gas outlet flowline (not shown).

Inner casing 107 extends from liquid outlet 127 down through separator head-space 117 to ESP assembly 129. ESP assembly 129 comprises pump shroud 131, ESP pump 133, and ESP motor 135. Pump shroud 131 may extend to above, at, or below the bottom of intermediate casing 105. ESP intake 137 communicates through ESP pump 133 into ESP discharge connection 139 into liquid passage 141 of inner casing 107 for discharge through liquid outlet 127.

Prior art VASPS 101 is typically installed at a subsurface location at or above the mudline of subsea bed 145 and placed in base conduit 147 which is cemented in place in a dummy hole 149.

A wide selection of materials are available for constructing VASPS 101. Those reasonably skilled in the art of subsea production equipment are aware of material and equipment performance requirements for subsea equipment. Such individuals reasonably skilled in the art will consider factors such as operating temperatures and pressures, projected fluid production volumes, gas-liquid ratios, produced fluid quality, i.e., considering contaminants such as carbon dioxide and hydrogen sulfide, and other factors in selecting the materials to construct VASPS 101. It is expected that most components of VASPS 101 are commercially available or easily fabricated from standard oil field equipment.

The operation of prior art VASPS 101 will now be discussed with reference to FIG. 1. Produced two-phase (liquid and gas) wellbore fluids enter prior art VASPS 101 through fluid inlet 111. The wellbore fluids enter fluid annulus 113 and are routed through helix assembly 109 where they experience angular acceleration. The wellbore liquid stream (typically crude oil and water), being more dense that the wellbore gas (typically natural gas), will move to the inside edge of pressure housing 103 and begin moving downward under gravitational forces toward the bottom of pressure housing 103. As the gas and fluid streams begin to separate and the separated gas stream moves toward the outer wall of intermediate casing 105, gas-liquid interface 110 will form on top of helix assembly 109 and against the inner wall of pressure housing 103. The less dense wellbore gas stream will move toward the center of intermediate casing 105 and into gas annulus 121 through gas passages 119. The gas will then move up gas annulus 121 through gas passages 125 into separator head-space 117. The separated gas will then move out of prior art VASPS 101 through gas outlet 123 and into a gas outlet flowline (not shown) for further treating and handling.

As the produced liquids move to the inside wall of pressure housing 103 and move downward under gravitational force, liquid accumulation occurs at the bottom of the prior art VASPS 101 so as to establish a liquid height 143. The separated liquid may accumulate around ESP assembly 129 from fluid annulus 113 through liquid passages 120.

When liquid height 143 reaches a predetermined level, ESP motor 135 is energized to drive ESP pump 133. The monitoring of liquid height 143 and the control of ESP pump 133 are well known in the art and may utilize liquid still-wells with ultrasonic level sensors and variable speed pump controllers to control and power ESP pump 133 to remove accumulated, produced fluid from VASPS 101.

The separated liquids (oil and water) flow downward between intermediate casing 105 and pump shroud 131 as shown by flow arrows 151. At the bottom of pump shroud 131, the produced liquid stream changes direction and then begins to flow upward past ESP motor 135 into ESP intake 137 as shown by flow arrows 153. By flowing around the pump shroud 131 and back past ESP motor 135, the produced wellbore liquids act as a cooling medium by removing heat from and generated by ESP motor 135.

The separated liquid stream then flows through ESP pump 133 through ESP discharge connection 139 and into liquid passage 141 in inner casing 107 and out of prior art VASPS 101 through liquid outlet 127 as shown by flow arrows 155.

VASPS of the prior art and current inventions may vary in size and capacity. ESP assembly 129 may include a ESP motor 135 having a 100 to 2000 horsepower rating and ESP pump 133 capable of moving 100 to 50,000 barrels of fluid a day at discharge pressures up to 3000 psi.

Figure 2:
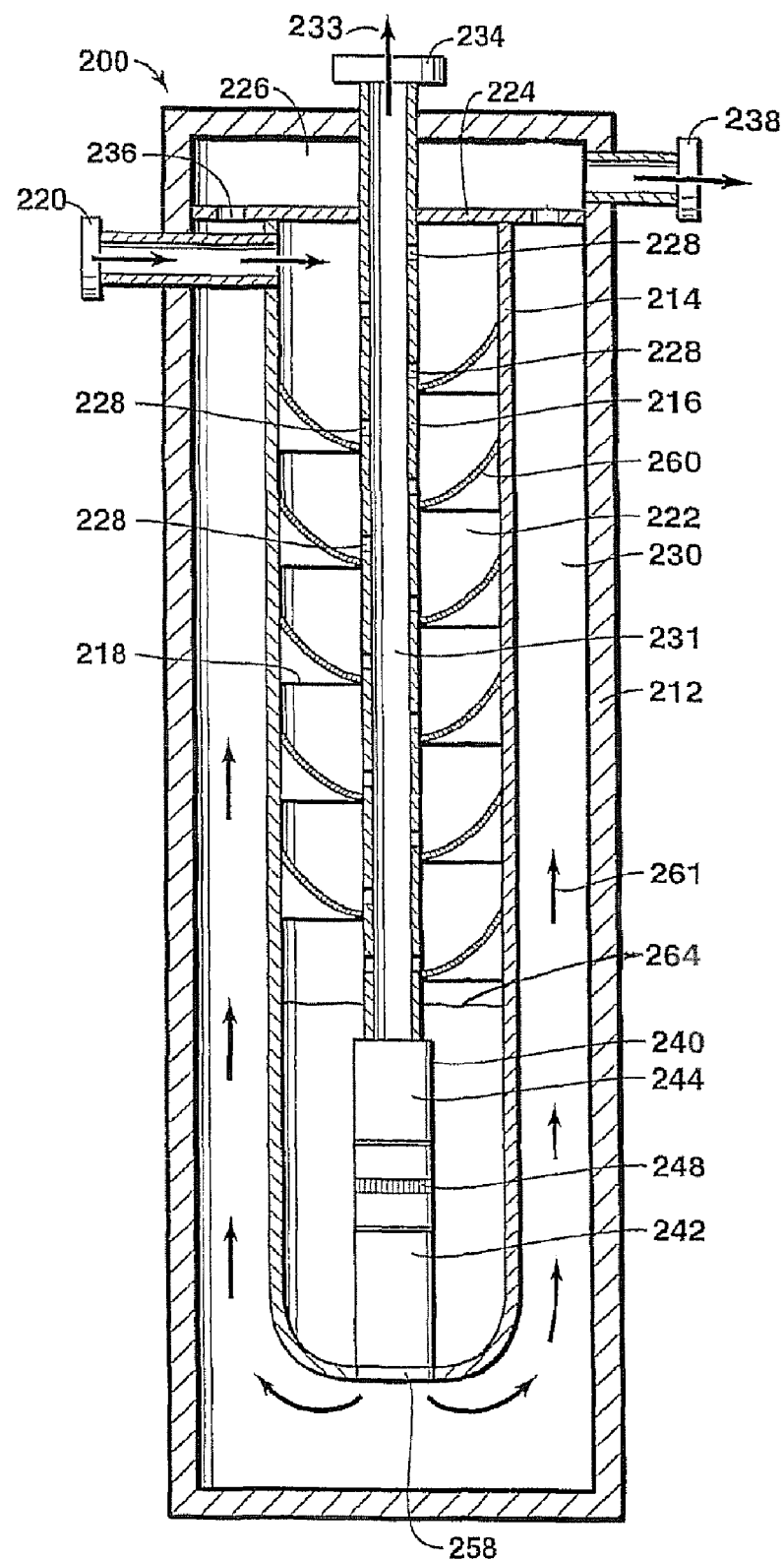
FIG. 2 is a sectional view of a VASPS unit according to the present invention.

FIG. 2 shows a sectional view of the improved VASPS 200 of the present invention. VASPS 200 is comprised of outer casing pressure housing 212 surrounding intermediate casing 214 surrounding inner casing gas discharge tubing 216. Pressure housing 212 and intermediate casing 214 may be constructed of any material, but are preferably constructed of standard oilfield tubulars such as casing materials or carbon steel pipe which are compatible with service conditions and requirements of a subsea facility. Likewise, gas discharge tubing 216, may be constructed of any material, but is preferably constructed of standard, screwed oilfield tubulars which allow the easy placement and retrieval of portions of VASPS 200. The upper and lower ends (not labeled in the Figures) of pressure housing 212 may be plates or other means to provide overall pressure containment for the operation of VASPS 200, particularly pressure housing 212, and each of the embodiments described herein. These plates or other means may be welded to or otherwise fixedly attached to pressure housing 212. Also, the upper and lower ends might be connected to pressure housing 212 by use of removable connections to provide for the removal and repair or replacement of VASPS 200.

Positioned between intermediate casing 214 and gas discharge tubing 216 is helix assembly 218. Helix assembly 218 may be a series of vanes or plates, preferably welded on to the outer wall of gas discharge tubing 216, that form a spiral conduit which contacts the inner wall of intermediate casing 214. Wellbore fluids enter pressure housing 212 through fluid inlet 220 into fluid annulus 222 which is formed by the inner wall of intermediate casing 214 and the outer wall of gas discharge tubing 216. Plate 224 is located at the top of intermediate casing 214 and extends to inner wall of pressure housing 212 and isolates separator head-space 226 from fluid annulus 222. Gas passages 228 extend through gas discharge tubing 216 and allow for fluid (primarily gas) communication between fluid annulus 222 and gas annulus 231. Gas phase flow 233 is noted by the arrows in FIG. 2.

It should also be understood that the Figures herein do not show any removable connectors means which might be used to secure and position the internal parts of VASPS 200 while providing for the removal for repair or replacement of VASPS 200. For example, no removable connector means are shown to secure helix assembly 218 to intermediate casing 214 or to secure intermediate casing 214 to pressure housing 212. Such connectors are considered standard equipment and well understood by individuals familiar with subsea oilfield production equipment and may be selected from commercially available subsea connector equipment.

Gas outlet 234 extends through pressure housing 212 to allow fluid (primarily gas) to exit the VASPS. Liquid passages 236 in plate 224 allow fluid (primarily liquid) communication between liquid annulus 230 and separator head-space 226. It is preferred that fluid inlet 220, gas outlet 234, and liquid outlet 238 be at or near the top of VASPS 200.

Liquid annulus 230 extends from the bottom of VASPS 200 along the wall of outer casing pressure housing 212 and is in fluid communication with liquid outlet 238 through liquid passage 236 and through separator head-space 226. At the bottom of VASPS 200, liquid annulus 230 extends into ESP assembly 240 at ESP discharge connection 258. ESP assembly 240 comprises ESP pump 242 and ESP motor 244. ESP pump 242 has ESP intake 248 (the pump inlet ports).

Intermediate casing 214 should preferably extend to or below the bottom of ESP assembly 240 with the exterior wall of intermediate casing 214 forming the interior wall of liquid annulus 230. ESP intake 248 communicates with fluid annulus 222 below helix assembly 218. ESP intake 248 is also in fluid communication with ESP pump 242 which moves liquid into ESP discharge connection 258 and into liquid annulus 230 for discharge through liquid passage 236 into head space 226 an through liquid outlet 238. Liquid phase flow 261 is noted by the arrows in FIG. 2.

Controls to operate ESP assembly 240 to discharge the separated liquids are not shown in FIG. 2. The monitoring of liquid level and the control of ESP assembly 240 are well known in the art and may utilize liquid still-wells with ultrasonic level sensors or other level control devices and variable speed pump controllers to control and power ESP assembly 240 to remove accumulated, produced fluid from VASPS 200.

Not shown in FIG. 2 is the placement of VASPS 200 on the subsea floor. VASPS 200 is preferably installed at a location at or above the mudline of subsea bed (not shown) and placed in base conduit (not shown) which is cemented in place in a dummy hole. However, depending on the application and location of associated subsea facilities, VASPS 200 may be installed in a base conduit extending partially into the seabed. It is also possible to have VASPS 200 resting on the seabed or even above the seabed when integrated with other production equipment.

The operation of VASPS 200 will now be discussed with reference to FIG. 2. Produced two-phase (liquid and gas) wellbore fluids enter VASPS 200 through fluid inlet 220. The wellbore fluids enter fluid annulus 222 where they experience angular acceleration caused by helix assembly 218. The wellbore liquids (typically crude oil and water), being more dense that the wellbore gas (typically natural gas), will move to the inside edge of intermediate casing 214 and begin moving under gravitational forces toward the bottom of pressure housing 212. The less dense wellbore gas will move toward the center of intermediate casing 214 and into gas annulus 231 through gas passages 228. Gas-liquid interface 260 is formed on the upper side of helix assembly 218. The gas will continue to move into gas annulus 231 through gas passages 228. The separated gas will expand and then move out of VASPS 200 through gas outlet 234 and a gas outlet flowline (not shown) to other treating and handling facilities.

As the produced liquids move to the inside edge of intermediate casing 214 and move downward under gravitational force, separated liquids accumulate at the bottom of VASPS 200 so as to establish a liquid height 264. The separated liquid may accumulate around ESP assembly 240 by moving downward through helix assembly 218.

When liquid height 264 reaches a predetermined level, ESP motor 244 is energized to drive ESP pump 242. The separated liquids (oil and water) flow downward between the outside wall of inner casing gas discharge tubing 216 and the inside wall of intermediate casing 214. Near the bottom of intermediate casing 214, the produced liquid flows past ESP motor 244 into ESP intake 248. By flowing past ESP motor 244, the produced wellbore fluids act as a cooling medium by removing heat from and generated by ESP motor 244. This cooling process assists in maintaining an acceptable operating temperature for ESP motor 244.

The produced liquids then move through ESP pump 242 and out ESP discharge connection 258 into liquid annulus 230. The produced fluids then pass through liquid passages 236 and into separator head space 226 before exiting VASPS 200 through liquid outlet 238 to a liquid discharge line (not shown) and to another facility (not shown) for further treating.

The most significant differences in the prior art VASPS 101 of FIG. 1 and the VASPS 200 of FIG. 2 are (i) the removal of the pump shroud 131 (FIG. 1), the relocation of the helix assembly 109 (FIG. 1), (ii) the replacement of the inner casing 107 (FIG. 1) to handle the fluid discharge with liquid annulus 230 (FIG. 2) between the inner casing gas discharge tubing 216 (FIG. 2) and outer casing pressure housing 212 (FIG. 2), (iii) relocating the gas annulus 121 (FIG. 1) with an inner casing gas discharge tubing 216 (FIG. 2) to collect and remove the separated gas phase stream, and (iv) the placement of ESP motor 244 (FIG. 2) above ESP pump 242 (FIG. 2). The removal of the pump shroud 131 (FIG. 1) provides many benefits, including reduced expenses associated with installing and maintaining the pump shroud and the ability to install a larger capacity ESP pump 242 (FIG. 2) to produce more fluid from a given VASPS unit without increasing the size of the pressure housing 212 (FIG. 2) or intermediate casing 214 (FIG. 2).

Figure 3:
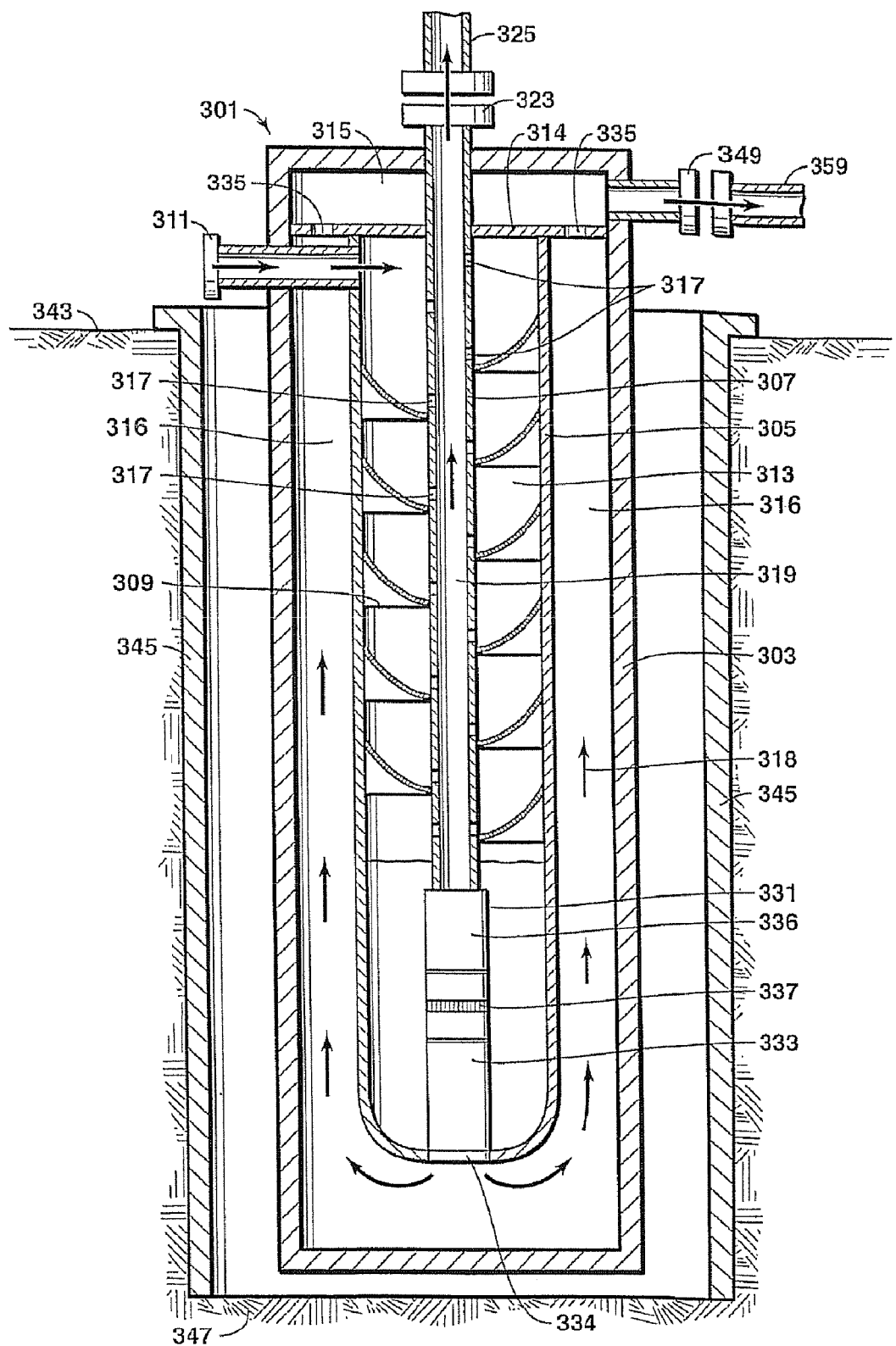
FIG. 3 is a sectional view of a VASPS unit according to the present invention mounted in a subsea location.

FIG. 3 shows a sectional view of a preferred embodiment of the present invention. VASPS 301 comprises pressure housing 303 surrounding intermediate casing 305 surrounding inner casing gas discharge tubing 307. Positioned between intermediate casing 305 and inner casing gas discharge tubing 307 is helix assembly 309.

Fluid inlet 311 allows fluids to enter pressure housing 303 into fluid annulus 313 which is formed by the inner wall of intermediate casing 305 and the outer wall of inner casing gas discharge tubing 307. Plate 314 is located at the top of intermediate casing 305 and isolates separator head-space 315 from fluid annulus 313. Gas passages 317 allow for fluid (primarily gas) communication between fluid annulus 313 and gas annulus 319 in inner casing gas discharge tubing 307. Gas outlet 323 extends through pressure housing 303 to allow fluid (primarily gas) communication between gas annulus 319 and gas outlet flowline 325.

Liquid annulus 316 is formed between the outside wall of intermediate casing 305 and the inner wall of outer casing pressure housing 303. Liquid annulus 316 extends from plate 314 near the top of VASPS 301 down to ESP discharge connection 334. Liquid passages 335 allow fluid communication between liquid annulus 316 and separator head-space 315. Liquid outlet 349 extends through pressure housing 303 to allow fluid (primarily liquid) communication between separator headspace 315 and liquid flowline 359. Liquid phase flow 318 is noted by the arrows in FIG. 3.

ESP assembly 331 comprises ESP pump 333, ESP motor 336, and ESP intake 337. ESP assembly 331 is suspended and preferably held in place within VASPS 301 at the end of inner casing gas discharge tubing 307.

VASPS 301 is shown installed at a subsurface location at or above the mudline of subsea bed 343 and placed in base conduit 345, which is cemented in place in a dummy hole 347.

A complete installation and operation of a VASPS of the present invention would include installing a VASPS unit at a subsea location; providing a floating or other production vessel, platform, or other subsea or onshore arrangement (collectively referred to as a production facility); installing a piping system to transport separated gases and liquids to the production facility; connecting a power source and a control source to the VASPS unit; producing wellbore fluids from the subsea location; transporting the produced wellbore fluids to the VASPS unit; separating the produced wellbore fluids into a gas phase and a liquid phase; transporting the gas and liquid phase fluids to the production facility.

Having now fully described this invention, it will be appreciated by those skilled in the art that the invention can be performed within a wide range of parameters within what is claimed, without departing from the spirit and scope of the invention.

What is claimed is:

1. A subsea vertical separator capable of separating produced wellbore fluids into a liquid phase and a gas phase, such separator comprising:
   (a) an intermediate casing within an outer casing, forming a first annulus;
   (b) an inner casing within the intermediate casing, forming a second annulus;
   (c) a fluid inlet in communication with the second annulus;
   (d) a liquid outlet in communication with the first annulus;

(e) a gas passage in the inner casing for conducting separated gas phase fluids, wherein the gas passage has a gas inlet and a gas outlet;
(f) a pump assembly comprising a pump positioned within the intermediate casing having (i) a pump intake in fluid communication with the second annulus and (ii) a pump discharge in fluid communication with the first annulus;
(g) a motor to drive the pump; and
(f) a helix assembly positioned in the second annulus between the inner casing and the intermediate casing,
wherein the outer casing further comprises a housing with an upper end and a lower end to provide pressure containment for the first annulus, second annulus, and gas passage.

2. A subsea vertical separator capable of separating produced wellbore fluids into a liquid phase and a gas phase, such separator comprising:
(a) an intermediate casing within an outer casing, forming a first annulus;
(b) an inner casing within the intermediate casing, forming a second annulus;
(c) a helix assembly positioned in the second annulus between the inner casing and the intermediate casing
(d) a fluid inlet in communication with the second annulus;
(e) a separator head space in fluid communication with the first annulus;
(f) a fluid outlet in fluid communication with the separator head space;
(g) a gas passage in the inner casing for conducting separated gas phase fluids, wherein the gas passage has a gas inlet and a gas outlet;
(h) a pump assembly comprising a pump positioned within the intermediate casing having (i) a pump intake in fluid communication with the second annulus and (ii) a pump discharge in fluid communication with the first annulus; and
(i) a motor to drive the pump,
wherein the outer casing further comprises a housing with an upper end and a lower end to provide pressure containment for the first annulus, second annulus, the separator head space, and gas passage.

3. A subsea vertical separator capable of separating produced wellbore fluids into a liquid phase and a gas phase, such separator comprising:
(a) an intermediate casing within an outer casing, forming a first annulus;
(b) an inner casing within the intermediate casing, forming a second annulus;
(c) a fluid inlet in communication with the second annulus;
(d) a liquid outlet in communication with the first annulus;
(e) a gas passage in the inner casing for conducting separated gas phase fluids, wherein the gas passage has a gas inlet and a gas outlet; and
(f) a pump assembly comprising a motor and a pump positioned within the intermediate casing having (i) a pump intake in fluid communication with the second annulus and (ii) a pump discharge in fluid communication with the first annulus,
wherein the outer casing further comprises a housing with an upper end and a lower end to provide pressure containment for the first annulus, second annulus, a separator head space, and gas passage.

4. A method for producing hydrocarbons from a subsea location comprising:
(a) providing a production facility;
(b) installing a subsea vertical separator capable of separating produced wellbore fluids into a liquid phase and a gas phase, such separator comprising:
(i) an intermediate casing within an outer casing, forming a first annulus;
(ii) an inner casing within the intermediate casing, forming a second annulus;
(iii) a fluid inlet in communication with the second annulus;
(iv) a gas passage in the inner casing for conducting separated gas phase fluids, wherein the gas passage has a gas inlet and a gas outlet;
(vi) a pump assembly comprising a pump positioned within the intermediate casing having (a) a pump intake in fluid communication with the second annulus and (b) a pump discharge in fluid communication with the first annulus; and
(vii) a motor assembly to drive the pump,
wherein the outer casing further comprises a housing with an upper end and a lower end to provide pressure containment for the first annulus, second annulus, and gas passage;
(c) installing a piping system to transport separated gas to the production facility;
(d) installing a piping system to transport separated liquids to the production facility;
(e) connecting a power source and a control source to the motor assembly;
(f) producing wellbore fluids from the subsea location;
(g) transporting the produced wellbore fluids to the separator fluid inlet;
(h) separating the produced wellbore fluids into a gas phase and a liquid phase;
(i) transporting the gas phase fluids to the production facility; and
(j) transporting the liquid phase fluids to the production facility.

* * * * *